(12) United States Patent
Bartnik

(10) Patent No.: US 9,775,271 B2
(45) Date of Patent: Oct. 3, 2017

(54) CONFIGURABLE HAND TOOL SYSTEM WITH INTERCHANGEABLE WORK HEADS

(71) Applicant: Robert Bartnik, Victoria (CA)

(72) Inventor: Robert Bartnik, Victoria (CA)

( * ) Notice: Subject to any disclaimer, the term of this patent is extended or adjusted under 35 U.S.C. 154(b) by 276 days.

(21) Appl. No.: 14/767,246

(22) PCT Filed: Feb. 26, 2014

(86) PCT No.: PCT/CA2014/000155
§ 371 (c)(1),
(2) Date: Aug. 11, 2015

(87) PCT Pub. No.: WO2014/131112
PCT Pub. Date: Sep. 4, 2014

(65) Prior Publication Data
US 2015/0373895 A1      Dec. 31, 2015

(30) Foreign Application Priority Data

Feb. 27, 2013   (CA) .................................... 2808733

(51) Int. Cl.
| | | |
|---|---|---|
| A01B 1/22 | (2006.01) | |
| A01B 1/02 | (2006.01) | |
| A01B 1/06 | (2006.01) | |
| A01B 7/00 | (2006.01) | |
| A01B 9/00 | (2006.01) | |
| E01H 5/02 | (2006.01) | |
| A01B 1/20 | (2006.01) | |

(Continued)

(52) U.S. Cl.
CPC ................ *A01B 1/022* (2013.01); *A01B 1/02* (2013.01); *A01B 1/024* (2013.01); *A01B 1/08* (2013.01); *A01B 1/20* (2013.01); *A01B 1/227* (2013.01); *A01D 7/00* (2013.01); *A01D 9/00* (2013.01); *A01D 11/06* (2013.01); *E01H 5/02* (2013.01)

(58) Field of Classification Search
CPC ........... A01B 1/022; A01B 1/02; A01B 1/024; A01B 1/20; A01B 1/08; A01B 1/227; A01D 7/00; A01D 9/00; A01D 11/06; E01H 5/02
See application file for complete search history.

(56) References Cited

U.S. PATENT DOCUMENTS

| | | | | |
|---|---|---|---|---|
| 142,149 A | * | 8/1873 | Crossland ................ | A01B 1/08 172/371 |
| 173,399 A | * | 2/1876 | Engle ....................... | A01B 1/20 172/375 |

(Continued)

FOREIGN PATENT DOCUMENTS

| | | | | |
|---|---|---|---|---|
| CA | 2766448 A1 | 3/2011 | | |
| CA | 2808733 A1 | * | 8/2014 | ............... A01B 1/02 |

(Continued)

*Primary Examiner* — Thomas B Will
*Assistant Examiner* — Joan D Misa
(74) *Attorney, Agent, or Firm* — Tomlinson McKinstry, P.C.

(57) ABSTRACT

A multi-use hand tool system featuring modular interchangeable components including a digging and cutting head, a rake head; a claw hammer head, a snow shovel head; a garden fork head comprising, one or more hafts, an offset-L component providing a 90 degree orientation between components and/or and handle. The hand tool system features components and grips having a Reuleaux triangle configuration.

16 Claims, 9 Drawing Sheets

(51) Int. Cl.
*A01B 1/08* (2006.01)
*A01D 7/00* (2006.01)
*A01D 9/00* (2006.01)
*A01D 11/06* (2006.01)

(56) References Cited

U.S. PATENT DOCUMENTS

| | | | | |
|---|---|---|---|---|
| 212,883 A * | 3/1879 | Balmore | | A01B 1/02 294/49 |
| 243,354 A * | 6/1881 | Bellamy | | A01B 1/227 294/176 |
| 488,582 A * | 12/1892 | Smith | | A01B 1/08 172/381 |
| 576,756 A * | 2/1897 | Cole | | A01B 1/022 294/57 |
| 634,696 A * | 10/1899 | Michie | | A01B 1/022 7/116 |
| 819,181 A * | 5/1906 | Stenstrom | | A01B 1/022 294/51 |
| 878,920 A * | 2/1908 | Williams | | A01B 1/20 172/375 |
| 896,345 A * | 8/1908 | Armstrong, Sr. | | A01B 1/022 254/251 |
| 1,139,472 A * | 5/1915 | Arnold | | A01B 1/227 403/241 |
| 1,191,810 A * | 7/1916 | Miller | | A01B 1/022 294/51 |
| 1,638,390 A * | 8/1927 | Bowen | | A01B 1/227 403/241 |
| 1,869,850 A * | 8/1932 | Hennecke | | B25D 1/02 30/308.3 |
| 1,928,347 A * | 9/1933 | Cooley | | A01B 1/20 172/375 |
| 3,186,750 A * | 6/1965 | Nelson | | A01B 1/02 294/56 |
| 3,947,140 A * | 3/1976 | Thomas | | A61H 3/02 135/69 |
| 4,162,132 A * | 7/1979 | Kress | | A01B 1/227 172/373 |
| 4,476,939 A | 10/1984 | Wallace | | |
| 4,478,033 A * | 10/1984 | Konyn | | A01D 11/06 172/375 |
| 4,538,847 A * | 9/1985 | Lapshansky | | A01B 1/222 294/51 |
| RE32,948 E * | 6/1989 | Lapshansky | | A01B 1/222 294/51 |
| 5,060,343 A * | 10/1991 | Nisenbaum | | B25G 1/00 15/145 |
| 5,085,478 A * | 2/1992 | Seifert | | A01B 1/024 294/60 |
| 5,185,992 A * | 2/1993 | Garcia | | A01B 1/227 172/375 |
| 5,263,253 A * | 11/1993 | Sainsbury | | A01B 1/02 294/49 |
| 5,503,445 A * | 4/1996 | Fontaine | | A01B 1/024 294/60 |
| 5,752,285 A * | 5/1998 | Bendheim | | A01B 1/20 172/378 |
| 5,791,708 A | 8/1998 | Capriotti | | |
| 5,799,996 A * | 9/1998 | Fredrickson | | A01B 1/20 172/375 |
| 6,199,245 B1 * | 3/2001 | Blessing | | B25G 1/06 16/422 |
| 6,347,562 B1 * | 2/2002 | Gerber, Jr. | | B25D 1/02 81/25 |
| 6,357,148 B1 * | 3/2002 | Salmonsen | | A01B 1/22 16/111.1 |
| D670,150 S * | 11/2012 | Angel | | D8/107 |
| D670,151 S * | 11/2012 | Angel | | D8/107 |
| 8,322,764 B2 | 12/2012 | Miller et al. | | |
| D721,213 S * | 1/2015 | Hamilton | | D32/46 |
| 8,960,743 B1 * | 2/2015 | Hasenjaeger | | A01B 1/227 294/51 |
| 9,050,717 B2 * | 6/2015 | Mouch | | B25G 3/04 |
| 9,180,589 B2 * | 11/2015 | Gerosa | | B25G 1/102 |
| 9,259,834 B2 * | 2/2016 | Mouch | | B25G 1/04 |
| 2003/0150478 A1 * | 8/2003 | Biggs | | B25G 1/102 134/6 |
| 2003/0184104 A1 * | 10/2003 | Ping | | A01B 1/227 294/57 |
| 2008/0092337 A1 * | 4/2008 | Gross | | B25G 1/102 16/430 |
| 2012/0098282 A1 * | 4/2012 | Langan | | B25F 1/006 294/49 |
| 2012/0133161 A1 * | 5/2012 | Mitchell | | B25G 1/06 294/49 |
| 2017/0057074 A1 * | 3/2017 | D'Avignon | | B25F 1/02 |

FOREIGN PATENT DOCUMENTS

| | | | | |
|---|---|---|---|---|
| DE | 2903833 A1 * | 8/1980 | | A01B 1/022 |
| DE | 2660679 C2 * | 11/1984 | | A01B 1/227 |
| DE | 10 2005 060 437 A1 | 6/2007 | | |
| ES | CA 2885937 A1 * | 4/2014 | | A01B 1/022 |
| FR | 376949 A * | 8/1907 | | A01B 1/022 |
| FR | 412537 A * | 7/1910 | | A01B 1/022 |
| FR | 1171157 A * | 1/1959 | | A01B 1/02 |

\* cited by examiner

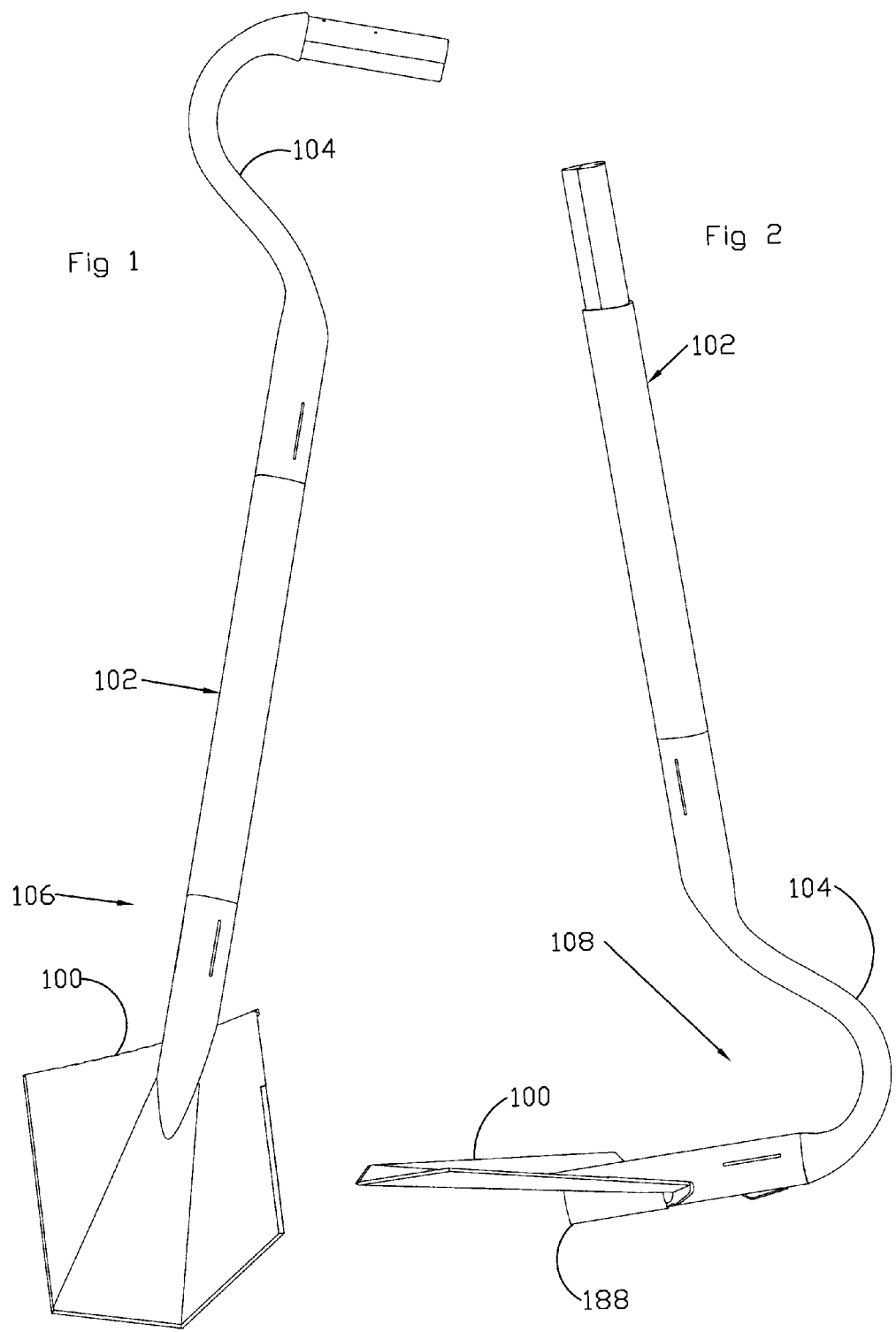

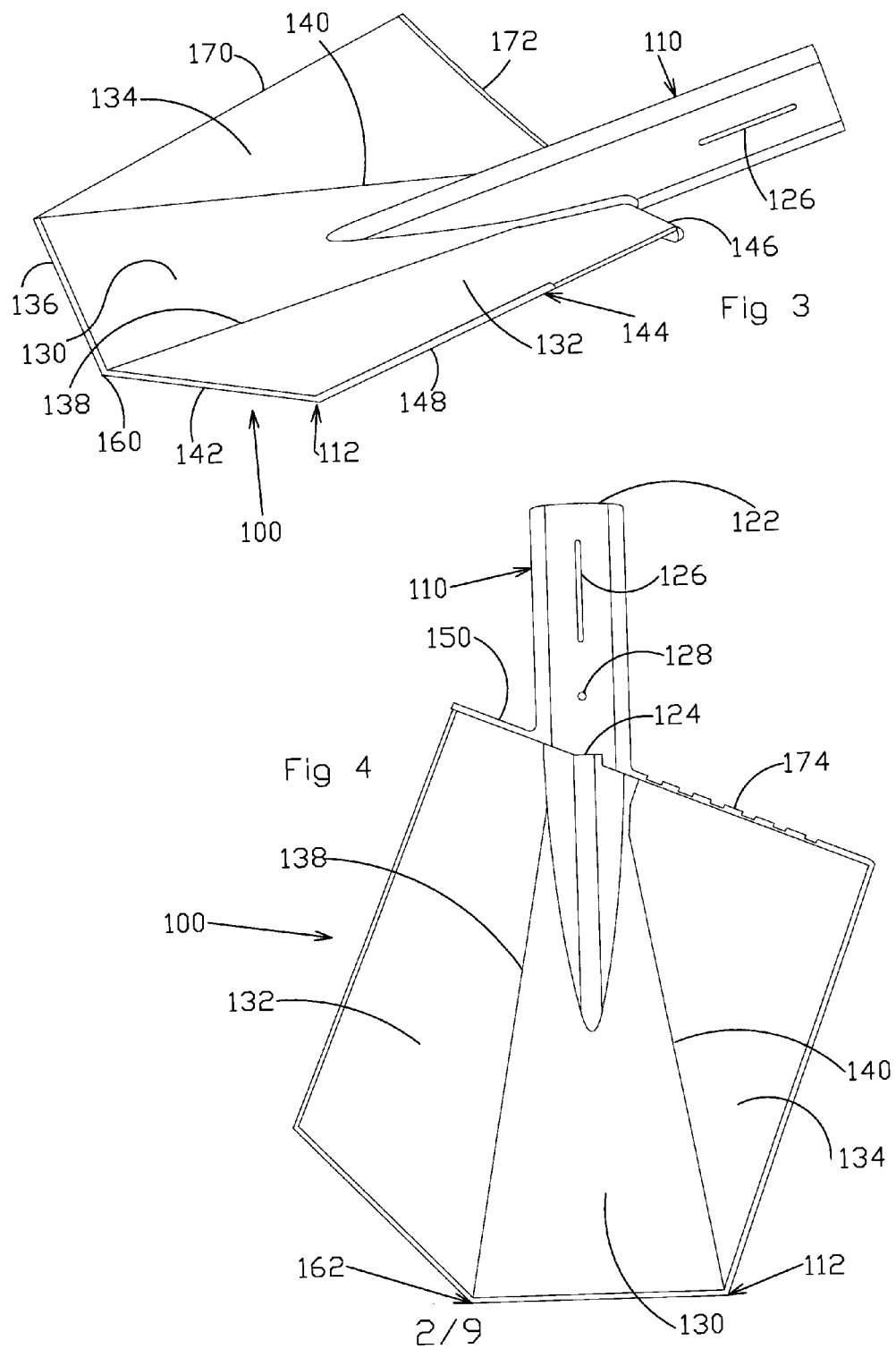

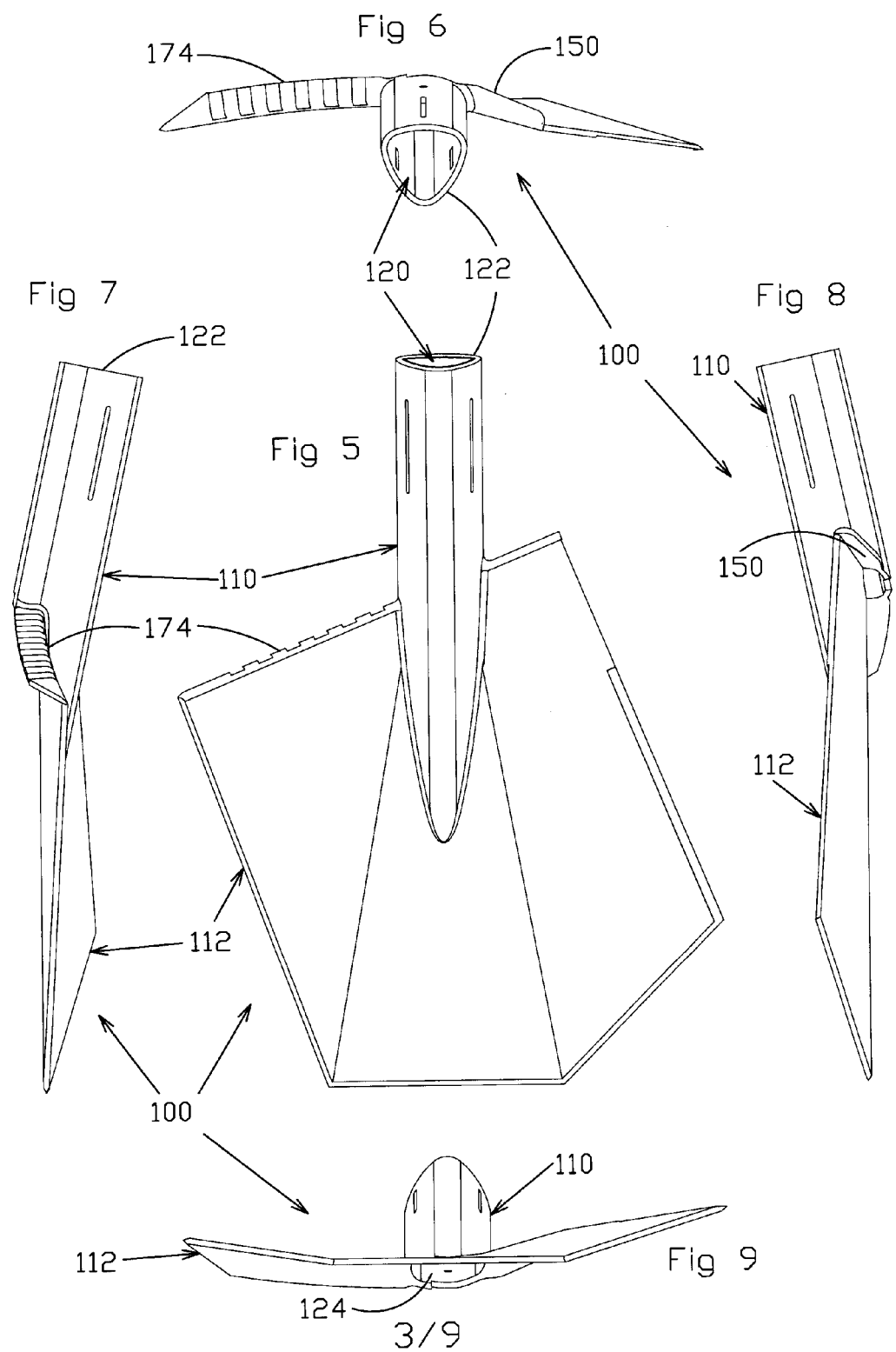

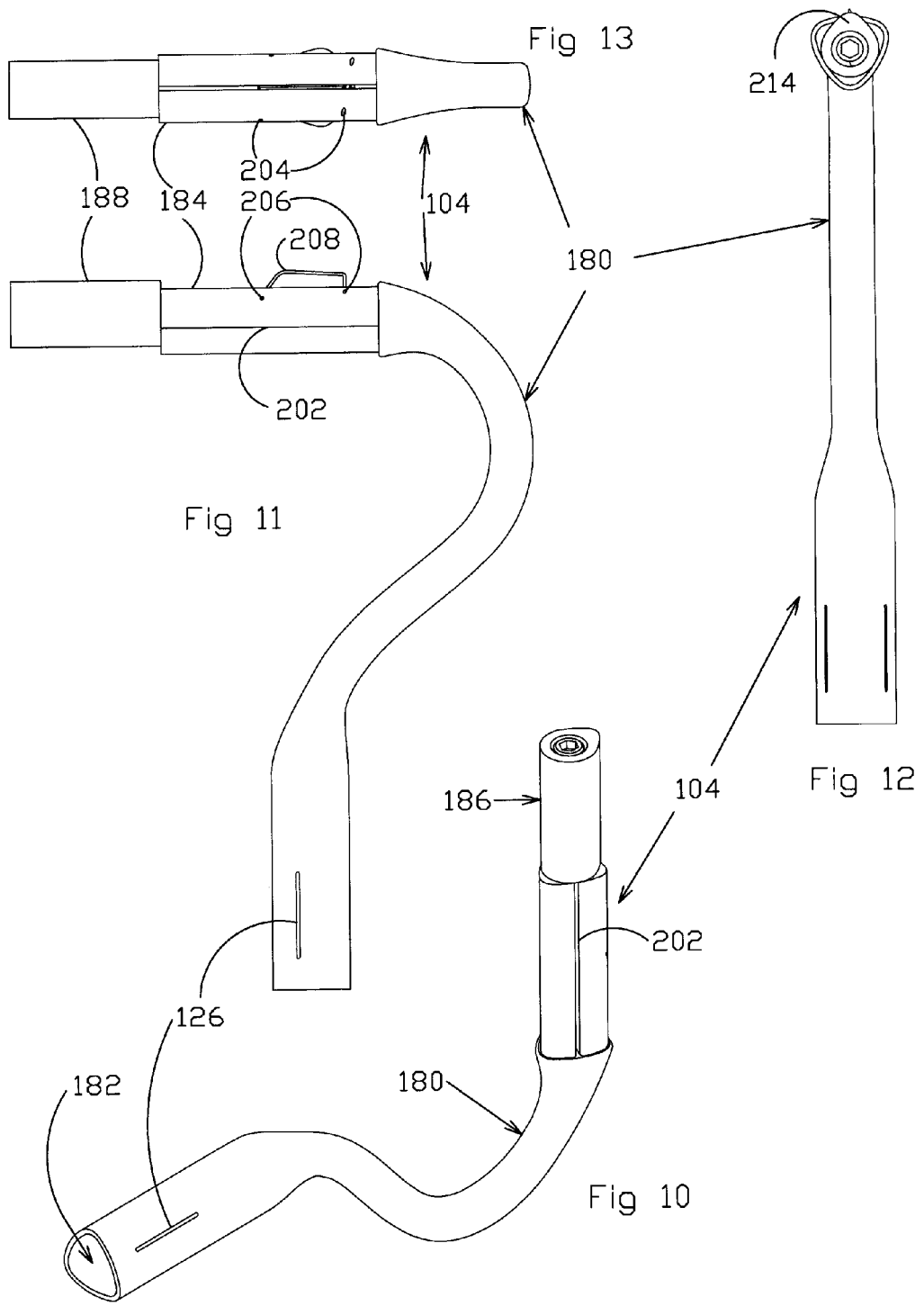

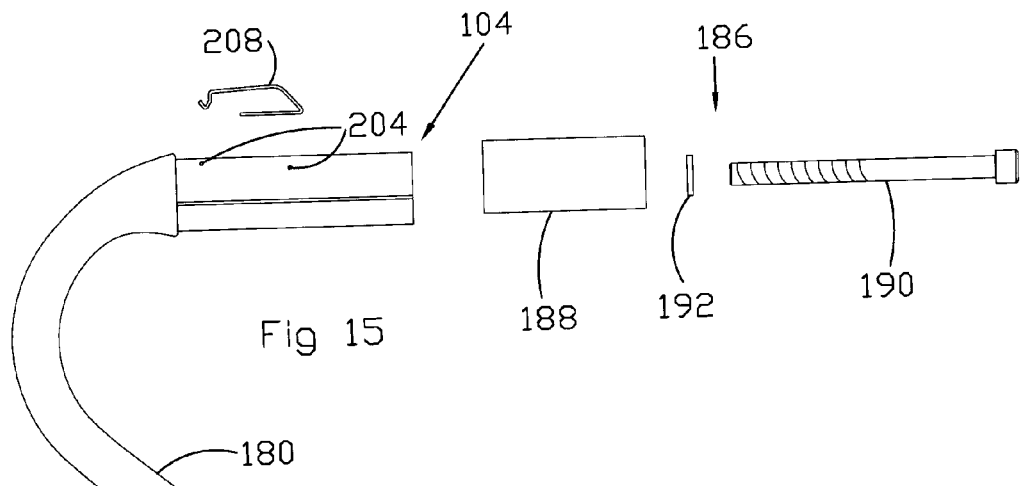
Fig 15
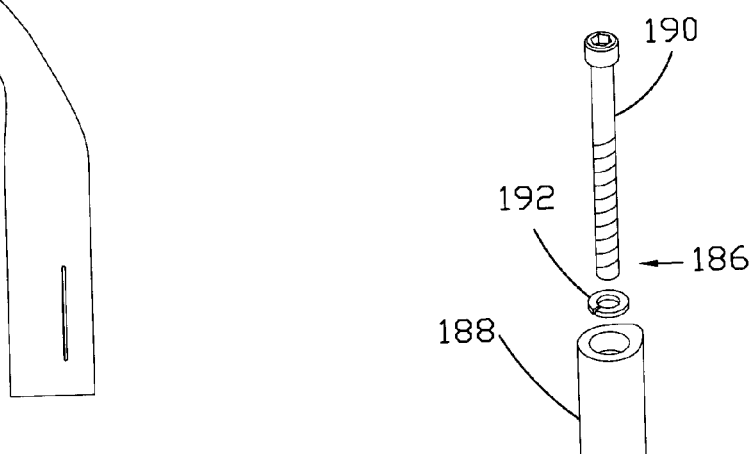
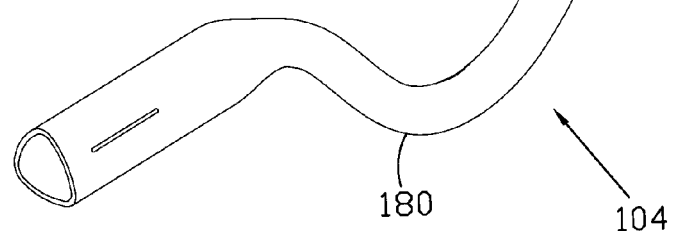
Fig 14

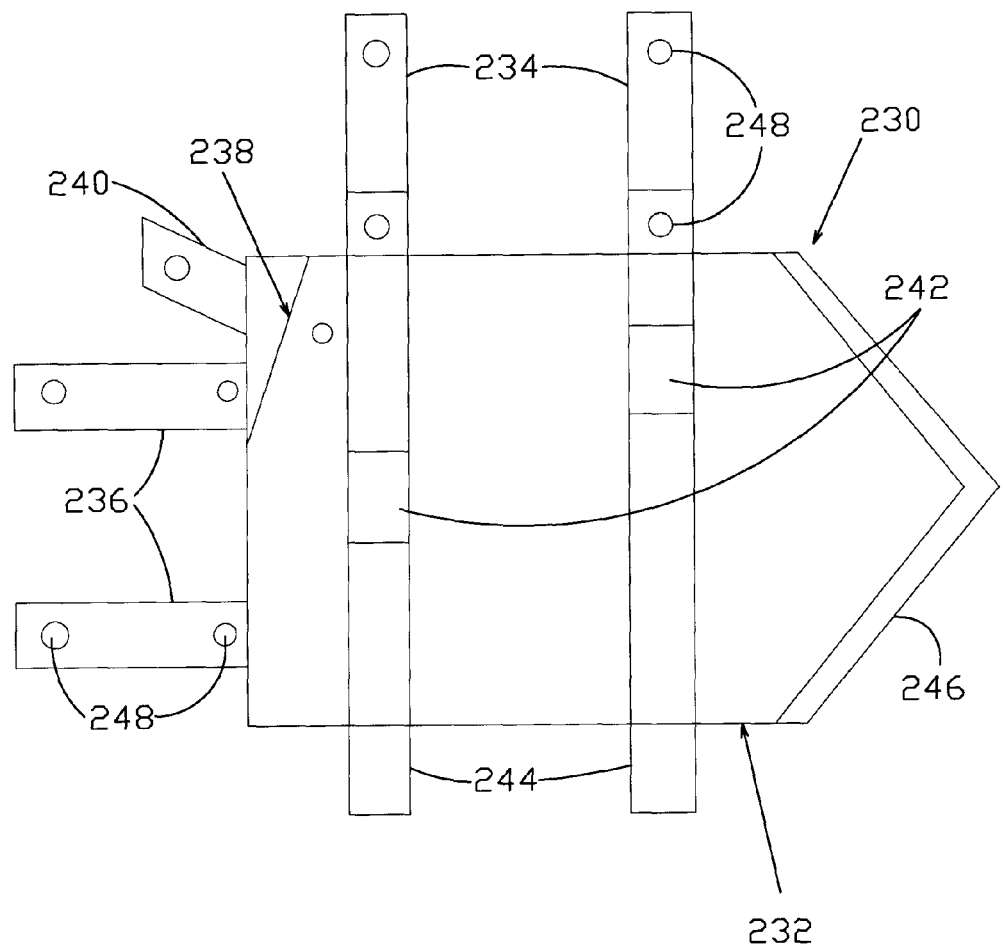
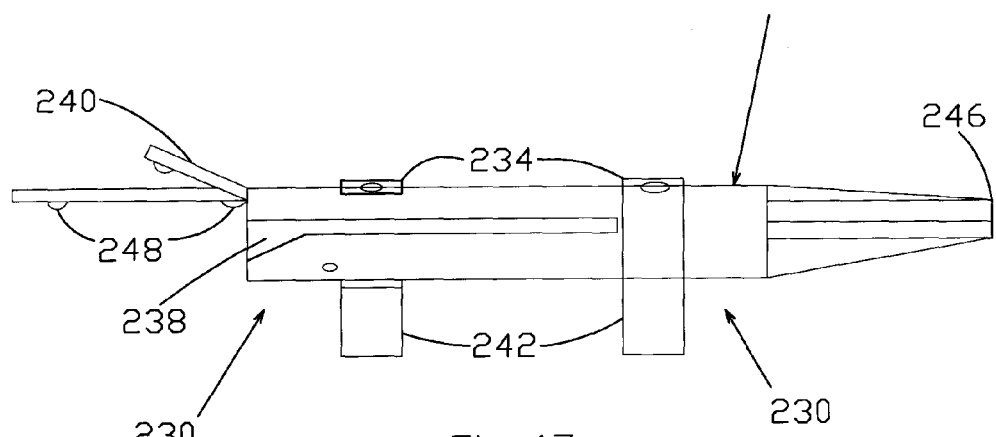

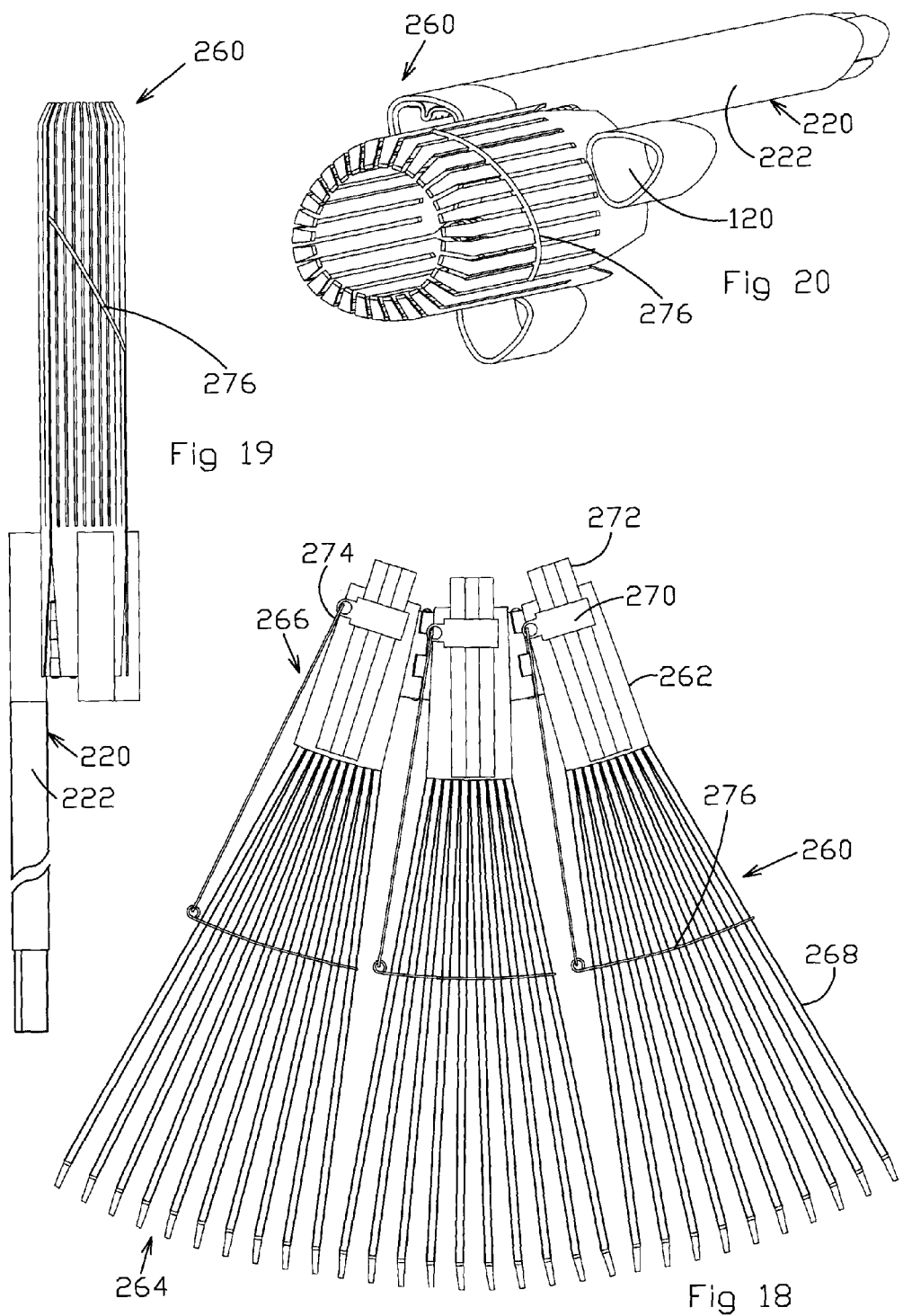

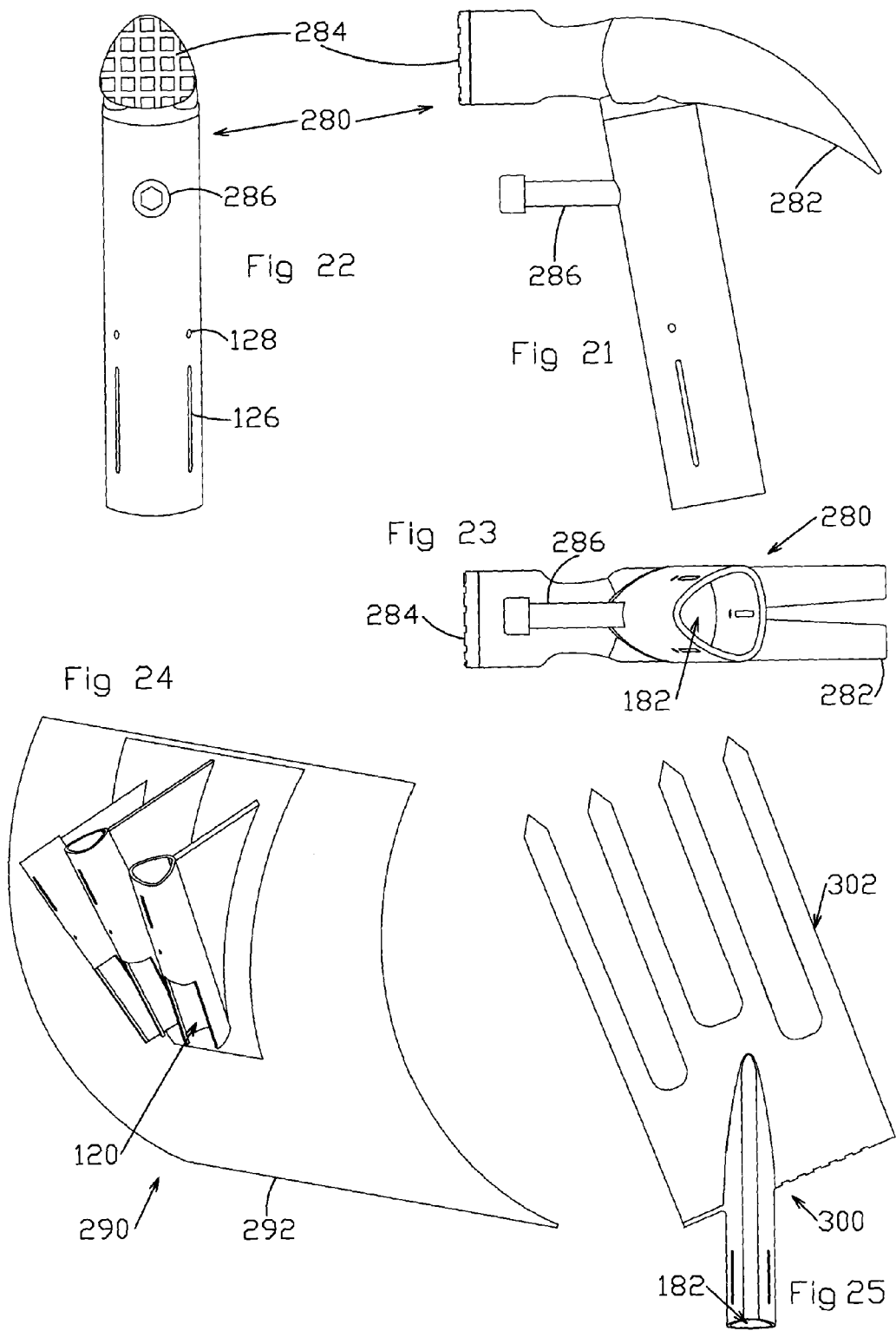

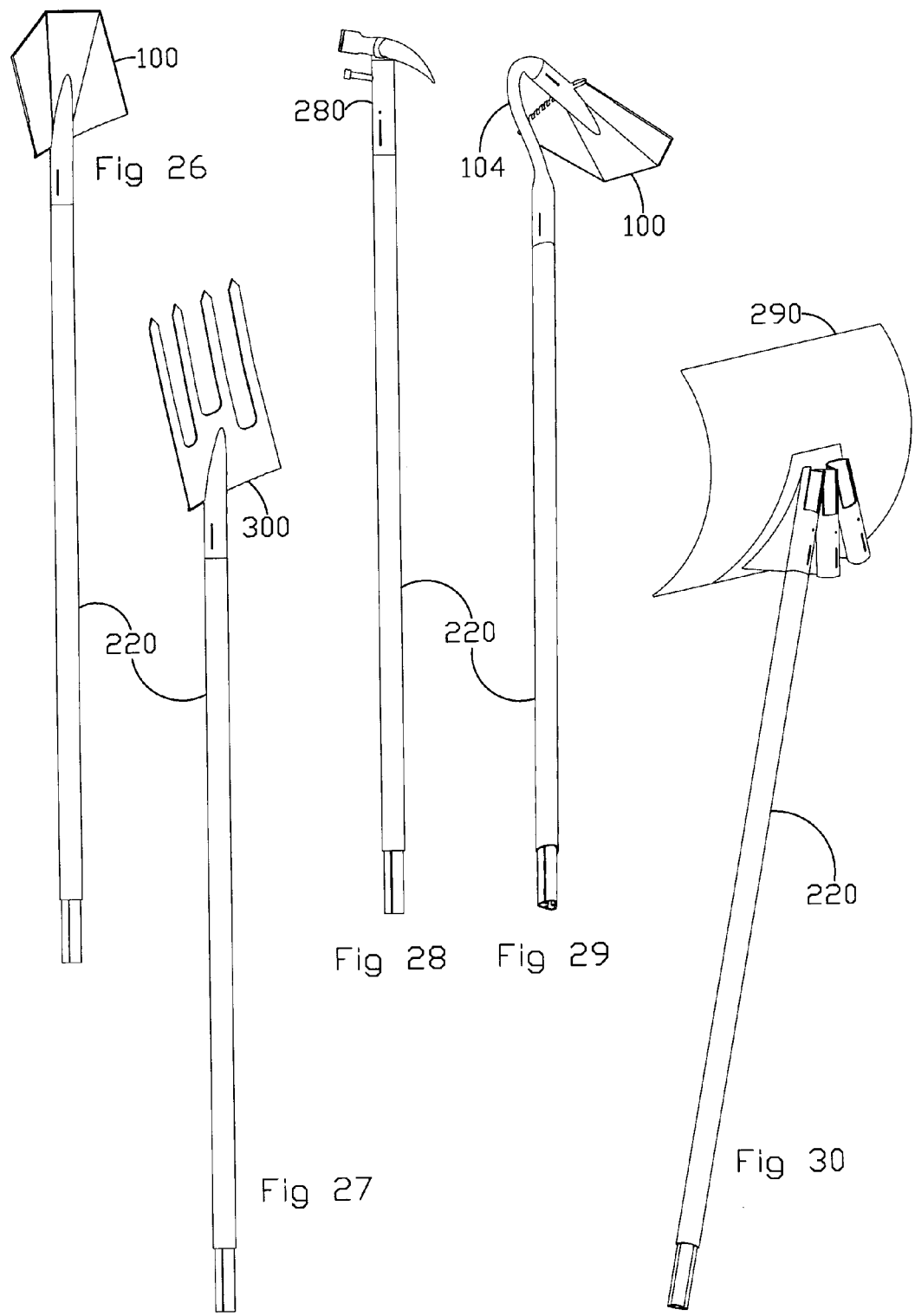

CONFIGURABLE HAND TOOL SYSTEM WITH INTERCHANGEABLE WORK HEADS

CROSS REFERENCE TO RELATED APPLICATIONS

This application claims the benefit of Canadian Patent Application Serial No. 2,808,733, filed 27 Feb. 2013.

FIELD OF THE INVENTION

The present invention relates to the field of hand tools, in particular to hand tools for use in digging, cutting, chopping, raking, shoveling, hammering, and forking.

BACKGROUND OF THE INVENTION

The history of developments in digging, shoveling, scooping and related long-hafted tools is long and varied. For example, as indicated in: U.S. Pat. No. D4969, Parliman, Design for Spade, 30 May 1871; U.S. Pat. No. 255,923, Bradner, Grocer's Scoop, 4 Apr. 1882; U.S. Pat. No. 628,202, Laws, Shovel, 4 Jul. 1889; U.S. Pat. No. 648,321, Westerberg, Shovel, 24 Apr. 1900; U.S. Pat. No. 841,848, Conner; Walk Cleaner, 22 Jan. 1907; U.S. Pat. No. 1,323,980, Hare, Trowel, 2 Dec. 1919; and U.S. Pat. No. 2,594,508, Sitton, Lawn Edger, 29 Apr. 1952.

Many specialized tools are known, including: lawn and garden spades, hoes, cultivators, weeders, trowels, edgers, dibblers, trenchers, crumb shovels, dustpans, scoops, pruning knives, picks, adzes, camp shovels, machetes, hatchets, tampers, axes, camp knives, draw knives, spoke shaves, shake cutters, snow/rescue shovels, auto shovels, military shovels (e.g., the Spetsnaz Military Shovel (circa 1905)), folding shovels etc.

An example of a folding shovel is the so-called Chinese Military Shovel, in which the haft and shovel blade are pivotally attached one to the other, and the hinged attachment is configured to releasably secure the haft and blade in a plurality of pre-selected angled orientations between a spade-like configuration with the blade extending from the haft in general alignment with the haft, and a folded configuration in which the blade essentially overlies the haft. With such folding shovels it is known to configure the sides of the blade so as to provide a cutting edge (e.g., serrated) and/or a chopping edge.

Tools with hafts and interchangeable heads are known, for example, in the K2™ Rescue Shovel Plus Ice Axe, a rescue shovel is interchangeable with an ice axe head.

SUMMARY OF THE INVENTION

In one aspect, the present invention provides a hand tool system including:
 a haft having a haft longitudinal axis;
 an offset-L component comprising a releasable first attachment means and a releasable second attachment means, the second attachment means oriented at about 90 degrees to the first attachment means; and
 a digging and cutting head comprising
  a blade, the blade comprising:
   a planar central panel in the shape of an obliquely truncated acute isosceles triangle, the base of the isosceles triangle defining a hoe tip;
   a right panel meeting the central panel at a bend having an angle of about 8 degrees and having a tip edge meeting the hoe tip at an angle of about 135 degrees, the tip edge and the hoe tip together defining a spade tip; and
   a left panel meeting the central panel at a bend having an angle of about 8 degrees and having a top edge defining a foot cleat; and
  a mount for releasably attaching the digging and cutting head to the haft or to the offset-L component, and defining a mount longitudinal axis,
 wherein the mount and blade are affixed one to another such that: the mount longitudinal axis lies within a plane substantially normal to, and substantially bisecting, the central panel isosceles triangle and the mount longitudinal axis intersects the plane defined by the central panel at an angle of about 15 degrees;
 wherein, the haft, offset-L component, and digging and cutting head may be selectively releasably assembled:
  into a spade-like configuration, by attaching the first attachment means to an end of the haft and attaching the mount to the opposite end of the haft, and in which the second attachment means functions as a handle extending substantially perpendicular to the haft longitudinal axis and the haft is angled relative to the spade tip; or
  a hoe-like configuration, by attaching the first attachment means to an end of the haft and attaching the mount to the second attachment means, and in which the hoe tip is substantially normal to a plane containing the haft longitudinal axis and the mount longitudinal axis.

The identical angles of the central panel isosceles triangle may be about 80 degrees; and a plane bisecting the 135 degree angle defined by the meeting of the tip edge and the hoe tip, and normal to the plane defined by the central panel, may intersect at an angle of about 22.5 degrees, a plane substantially normal to the plane defined by the central panel and containing the mount longitudinal axis. The left panel may be curved and the foot cleat may be corrugated.

The mount and the first attachment means may each include a longitudinally extending chamber having a cross section substantially in the shape of a Reuleaux triangle; and the two ends of the haft and the second attachment means, may each include a stub configured for mating engagement with any one of the longitudinally extending chambers. The mount chamber may have a stub receiving opening and a securement opening; and the second attachment means may include a toggle manually rotatable between an insertion position in which the toggle does not impede movement of the stub into the stub receiving opening and an engagement position in which the toggle engages the securement opening so as to impede withdrawal of the stub from the mount chamber. Each stub may include a depressable projecting catch; and each chamber may include a catch opening configured for receiving the catch when the stub is inserted into the chamber; whereby, when the catch is in the catch opening, the catch impedes withdrawal of the stub from the chamber, and the catch may be manually depressed so as to permit withdrawal of the stub from the chamber.

The hand tool system may include a rake head including two or more hingedly connected tine holders, each tine holder including: a tine set comprising a plurality of tines resiliently biased to move to, and remain in, a splayed arrangement; and a longitudinally extending chamber having a cross section substantially in the shape of a Reuleaux triangle configured for mating engagement with one of the stubs; wherein, the haft, offset-L component, and rake head may be selectively releasably assembled with the haft mounted to one of the tine holders and the offset-L component mounted to another of the tine holders, whereby the offset-L component may be manipulated to articulate the hinged connection between the tine holder to fold the rake head when gathering a volume of material in the tines.

Each tine holder may include a tine furler assembly including: a track fixed relative to the tine set and substantially aligned with the tines; a car mounted to, and slidable along, the track; a tine bridge spanning the tines of the tine set and having a slot corresponding to each such tine and within which each such tine is interposed, wherein the tine bridge is pivotally attached to a tine in the vicinity of an end of the tine bridge; and a linkage strut attached at one end to the car and attached at the other end to the tine bridge at the end of the tine bridge opposite where the tine bridge is pivotally attached to the tine, wherein the tine set may be brought into a furled arrangement by moving the car towards the tine set so as to bring the tine bridge into an angled orientation relative to the tines. The tine bridge may be curved whereby the furled arrangement is a curved furled arrangement.

The hand tool system may include additional hafts wherein the hafts have lengths different from each other.

The hand tool system may include a claw hammer head including: a hammer face; a longitudinally extending chamber having a cross section substantially in the shape of a Reuleaux triangle configured for mating engagement with one of the stubs; and a plank lifting lug.

The hand tool system may include a snow shovel head including: a snow shovel blade; and a plurality of longitudinally extending chambers angled relatively to each other, and each chamber having a cross section substantially in the shape of a Reuleaux triangle configured for mating engagement with one of the stubs; wherein the haft, offset-L component, and snow shovel head may be selectively releasably assembled: into a snow shovel-like configuration, with the haft stub inserted in one of the snow shovel head longitudinally extending chambers; and into a snow-draw configuration, with the offset-L component stub inserted in one of the snow shovel head longitudinally extending chambers and the haft stub inserted in the offset-L component longitudinally extending chamber. The hand tool system may include a second haft wherein the hafts and snow shovel head may be selectively releasably assembled into a double-handled snow shovel-like configuration, with one of the stubs of one of the hafts inserted in one of the snow shovel head longitudinally extending chambers; and one of the stubs of the other of the hafts inserted in another of the snow shovel head longitudinally extending chambers.

The hand tool system may include a garden fork head including: a fork; and a longitudinally extending chamber having a cross section substantially in the shape of a Reuleaux triangle configured for mating engagement with one of the stubs.

The hand tool system may include: a second haft wherein the hafts have different lengths; and additional heads each interchangeable with the digging and cutting head. The additional heads may be selected from the group consisting of a rake head; a claw hammer head, a snow shovel head, a garden fork head, and combinations of two or more of the foregoing.

Particulars of construction of Reuleaux triangle cross-section haft will vary depending on materials and intended use, obvious from the design of the socket. In general use, the length may vary from 20 cm to an overall length with spade of 150 cm. However, a user may desire a longer or shorter haft. To encourage local industry, haft may be formed from indigenous timber, bamboo, recycled materials or engineered woods, or from metal or fiberglass or other composites. Extensible hafts and hafts bent to particular special purposes may be used.

SUMMARY OF THE DRAWINGS

FIG. 1 shows component embodiments of the present invention assembled in a spade-like configuration.

FIG. 2 shows component embodiments of FIG. 1 assembled in a hoe-like configuration.

FIG. 3 is an isometric view of a digging and cutting head component embodiment of the present invention.

FIG. 4 is a view of the back of the digging and cutting head shown in FIG. 3.

FIG. 5 is a view of the front of the digging and cutting head shown in FIG. 3.

FIG. 6 is a view of the top of the digging and cutting head shown in FIG. 3.

FIG. 7 is a view of a side of the digging and cutting head shown in FIG. 3, being the side on the left side of FIG. 5.

FIG. 8 is a view of a side of the digging and cutting head shown in FIG. 3, being the side on the right side of FIG. 5.

FIG. 9 is a view of the bottom of the digging and cutting head shown in FIG. 3

FIG. 10 is an isometric view of a swan-neck component embodiment of the present invention.

FIG. 11 is an elevation view of the swan-neck component shown in FIG. 10.

FIG. 12 is a side elevation view of the swan-neck component shown in FIG. 10.

FIG. 13 is a plan view of the swan-neck component shown in FIG. 10.

FIG. 14 is an exploded perspective view of the swan-neck component shown in FIG. 10.

FIG. 15 is an elevation view of the swan-neck component shown in FIG. 10.

FIG. 16 is a schematic elevation representation of a sheath component embodiment of the present invention.

FIG. 17 is a schematic top-plan representation of the sheath shown in FIG. 16.

FIG. 18 is a plan view of a rake head component embodiment of the present invention, shown with the rake head open.

FIG. 19 is plan view of the rake head of FIG. 18 shown furled and assembled with a haft.

FIG. 20 is an isometric view of the rake head of FIG. 18 shown furled and assembled with a haft.

FIG. 21 is a side elevation view of a claw hammer head component embodiment of the present invention.

FIG. 22 is a front elevation view of the claw hammer head shown in FIG. 21.

FIG. 23 is an end view of the claw hammer head shown in FIG. 21.

FIG. 24 is an isometric view of a snow shovel head component embodiment of the present invention.

FIG. 25 is an isometric view of a garden fork head component embodiment of the present invention.

FIG. 26 is a plan view of the digging and cutting head shown in FIG. 3, shown assembled with a haft.

FIG. 27 is a plan view of the garden fork head shown in FIG. 25, shown assembled with a haft.

FIG. 28 is a plan view of the claw hammer head shown in FIG. 21, shown assembled with a haft.

FIG. 29 is an isometric view of the digging and cutting head shown in FIG. 3, shown assembled with a haft and a swan neck in a hoe-like configuration.

FIG. 30 is an isometric view of the snow shovel head shown in FIG. 24, shown assembled with a haft.

DETAILED DESCRIPTION WITH REFERENCE TO THE DRAWINGS

Component embodiments, and the associated available arrangements, of the hand-tool system invention are described in the following and shown in the drawings.

Component embodiments of the invention include features (including the inner walls of cavities or bores, and the outer profile of other features that mate with the cavities or bores), that generally define, in cross section, a Reuleaux triangle. A Reuleaux triangle is the simplest Reuleaux polygon, which is a curve of constant width, meaning that the distance between two parallel lines tangent to opposite sides of the curve, is independent of their orientation relative to the Reuleaux polygon. The Reuleaux triangle configuration is understood to generally provide rotation control, tactile feedback and better fit to the user and more options to apply force and reach, particularly with respect to components gripped by the user.

FIG. 1 shows a digging and cutting head 100, short haft 102 and swan-neck component 104, assembled in a spade-like configuration 106 in which the swan-neck component 104 functions as a handle. FIG. 2 shows the digging and cutting head 100, short haft 102 and swan-neck component 104, assembled in a hoe-like configuration 108 in which the swan-neck component 104 provides a desired angle between the digging and cutting head 100 and the short haft 102.

As shown in FIGS. 3-9, the digging and cutting head 100 includes a mount 110 and a blade 112, affixed one to the other.

The mount 110 includes a Reuleaux triangle bore 120 having a stub receiving opening 122 and a lobe-engagement opening 124. Arrayed about the mount 110 in an equally spaced relationship and generally aligned with the longitudinal axis of the Reuleaux triangle bore 120, are three retainer slots 126. The mount 110 optionally includes at least one threaded set screw hole 128.

The blade 112 includes a central panel 130, a flat panel 132 and a curved panel 134.

The central panel 130 has the general shape of an obliquely truncated acute isosceles triangle in which the two identical angles are each about 80 degrees. The base of the isosceles triangle defines a central panel spade tip portion 136. One side of the isosceles triangle is defined by the tip bend 138, being a linear bend of about 8 degrees between the central panel 130 and the flat panel 132. The other side of the isosceles triangle is defined by the side bend 140, being a linear bend of about 8 degrees between the central panel 130 and the curved panel 134. The angle of the bends may be varied by the user depending on the material used and the intended application to produce a desired depth for the blade 112.

The flat panel 132 has three outer edges, being: the flat panel spade tip portion 142, the flat panel cutting edge 144 and the flat panel hemmed edge 146. The flat panel cutting edge 144 preferably includes a cutter section 148 configured for cutting, being, for example, that the cutter section 148 is sharpened (as indicated in the drawings) and/or serrated. The flat panel hemmed edge 146 comprises a planar ledge 150 extending generally normal to the flat panel 132. The planar ledge 150 both stiffens the flat panel 132 and provides a useful work surface in the hand manipulation of the digging and cutting head 100, for example the digging and cutting head 100 may be used by itself (i.e., not assembled with another component) essentially as a garden trowel, in which case the user's thumb may rest against, and apply force via, the planar ledge 150.

The flat panel spade tip portion 142 meets the central panel spade tip portion 136 at the spade tip point 160, at an angle of about 135 degrees. Together the flat panel spade tip portion 142 and the central panel spade tip portion 136 comprise the spade tip 162.

The curved panel 134 has two outer edges, being: the curved panel side edge 170 and the curved panel cleat edge 172. The curved panel cleat edge 172 comprises a cleat 174 extending generally normal to the curved panel 134. In a preferred embodiment the curved panel cleat edge 172 and the cleat 174 define an arc having a diameter of about 50 cm. The cleat 174 is preferably textured (for example, as indicated in the drawings, with a square wave pattern of 8-10 regular spaced corrugations), so as to provide enhanced purchase for the user's foot. The cleat 174 also stiffens the curved panel 134.

Ignoring the tip bend 138 and side bend 140, and the curve of the curved panel 134, the blade 112 can be considered to generally define a five sided figure in which: the flat side panel cutting edge 144 and curved panel side edge 170 are two opposed parallel sides; the flat side panel hemmed edge 146 and curved panel cleat edge 172 define a third side extending between, and perpendicular to, the flat side panel cutting edge 144 and curved panel side edge 170; and the flat panel spade tip portion 142 and the central panel spade tip portion 136 define the two additional sides and meet at and angle of about 135 degrees at the spade tip point 160. Further, the line of symmetry of the blade 112 can be considered to be a passing through the spade tip point 160 and parallel to both the flat side panel cutting edge 144 and curved panel side edge 170.

In a preferred embodiment, the sides defined by: the flat side panel cutting edge 144, the curved panel side edge 170, and the flat side panel hemmed edge 146 and curved panel cleat edge 172, are all about the same length, being about 18.5 cm.

As indicated in the drawings, the mount 110 and blade 112 are affixed one to the other such that: when viewed normal to the central panel 130, the longitudinal axis of the Reuleaux triangle bore 120 bisects the isosceles triangle defined by the central panel 130 (such that the longitudinal axis of the Reuleaux triangle bore 120 is perpendicular to the central panel spade tip portion 136, and the longitudinal axis of the Reuleaux triangle bore 120 is at an angle of about 22.5 degrees relative to the line of symmetry of the blade 112); and when viewed parallel to the plane defined by the central panel 130 and normal to the longitudinal axis of the Reuleaux triangle bore 120, the longitudinal axis of the Reuleaux triangle bore 120 intersects the plane defined by the central panel 130 at an angle of about 15 degrees. The angle at which the longitudinal axis of the Reuleaux triangle bore 120 intersects the plane defined by the central panel 130 may be varied from 15 degrees depending on material and intended application.

The general configuration of the digging and cutting head 110 is understood to provide easier digging, cutting and moving of materials by application of torque, leverage and inclined planes for mechanical advantage and to reduce impact to the user.

The general configuration of the digging and cutting head 110 shown in the drawings is understood to be best suited for a right-handed user; It is understood that a digging and cutting head configured as a mirror image of the digging and cutting head 110 shown in the drawings would be preferable for a left-handed user.

As shown in FIGS. 10 to 15, the swan-neck component 104 includes a swan-neck body 180, the swan-neck body 180 including a Reuleaux triangle cavity 182 and Reuleaux triangle stub 184; and a toggle assembly 186 (not shown in FIG. 1), the toggle assembly 186, including a toggle 188, toggle retainer bolt 190 and a spring washer 192.

The Reuleaux triangle cavity 182 includes a stub receiving opening 122 and has associated retainer slots 126.

The Reuleaux triangle stub 184 is hollow and includes three equally spaced apart, longitudinally extending internal ridges 200, defining three longitudinally extending external grooves 202. Associated with the external grooves 202 are pin receiving holes 204 for receiving and retaining press fit pins 206 (not shown in the exploded views), for use in securing a retainer spring 208 in a respective external groove 202.

In use, when the Reuleaux triangle stub 184 is inserted into a Reuleaux triangle bore 120 (or a Reuleaux triangle cavity 182), contact with the inner walls of the Reuleaux triangle bore 120 causes the retainer spring 208 to be depressed into the external groove 202 until the retainer spring 208 comes into alignment with a respective retainer slot 126, when the retainer spring 208 springs outward into engagement with the retainer slot 126, so as to releasably retain the Reuleaux triangle stub 184 within the Reuleaux triangle bore 120. The user may hand depress the retainer spring 208 in order to withdraw the Reuleaux triangle stub 184 from the Reuleaux triangle bore 120.

The Reuleaux triangle bore 120 (or Reuleaux triangle cavity 182) may include one or more set screw holes 210 for use with a set screw (not shown) to releasably secure a Reuleaux triangle stub 184 within the Reuleaux triangle bore 120 (or Reuleaux triangle cavity 182).

When fitted, the toggle assembly 186 provides: a handle extension (when the components are assembled with the swan-neck component 104 in position to be used as a handle) enabling two-handed use; and a securing means for use with a Reuleaux triangle bore 120, and when so used, also provides support for the head, particularly with respect to levering movement.

In the embodiment shown in the drawings, the three internal ridges 200 include aligned sections of female threads 212 along their inward edges, such that the toggle retainer bolt 190 may be threadedly engaged within the Reuleaux triangle stub 184. The toggle assembly 186 is attached to the swan-neck body 180, by insertion of the toggle retainer bolt 190 through the spring washer 192 and the toggle 188, and threadedly engaging the toggle retainer bolt 190 with the female threads 212, in a manner such that the toggle 188 tends to remain in its relative rotational position with respect to the axis defined by the toggle retainer bolt 190, but the toggle 188 may be rotated by a user's hand. The toggle 188 may include indents and projections (not shown) configured to engage with the adjacent ends of the internal ridges 200 so as to provide the desired resistance to rotation from a user selected, and hand implemented, position.

As indicated most clearly in FIG. 12, the toggle 188 has a cam shape with a lobe 214. The toggle 188 may be rotated by the user so as to bring the lobe 214 into position to project beyond the periphery of the Reuleaux triangle stub 184 (as shown in FIG. 12). The toggle may also be rotated by the user so as to bring the lobe 214 within the periphery of the Reuleaux triangle stub 184. In this way, the toggle 188 may be used to releasably secure the Reuleaux triangle stub 184 within a Reuleaux triangle bore 120 in that the toggle 188 may be rotated to bring the to bring the lobe 214 within the periphery of the Reuleaux triangle stub 184 for insertion into the stub receiving opening 122, and then the toggle 188 may be rotated by the user to bring the lobe 214 into position to project beyond the Reuleaux triangle stub 184, so as to bring the end of the lobe 214 that is adjacent to the Reuleaux triangle stub 184 into releasable locking engagement with the lobe-engagement opening 124 (as indicated in FIG. 2).

A toggle assembly 186 may usefully be fitted to the Reuleaux triangle stub 184 of any of the components of the hand tool system when it is desirable to obtain the enhanced security of attachment between the Reuleaux triangle stub 184 and a Reuleaux triangle bore 120, provided by the engagement of the lobe 214 and the lobe-engagement opening 124.

The short haft 102 and the long haft 220 (shown in FIGS. 26-30) include a Reuleaux triangle shaft 222 having at each end a Reuleaux triangle stub 184. As shown in FIGS. 26 and 29, the digging and cutting head 100 and swan-neck component 104 may be assembled with the long haft 220 in the same general arrangements as shown in FIGS. 1 and 2 with respect to the short haft 102.

Haft lengths from 20 cm to overall length with spade of 150 cm are contemplated. However, the haft length may be varied as desired by the user. The haft material may be any material suitable for the intended use, including conventional materials such as wood, plastics and composites. To encourage local industry, haft may be formed from indigenous timber, bamboo, recycled materials or engineered woods, or from metal or fiberglass or other composites. Extensible hafts and hafts bent to particular special purposes may be used. An alternative haft (not shown in the drawings) is one having a Reuleaux triangle stub 184 at only one end.

FIGS. 16 and 17 show a sheath 230 for use with the digging and cutting head 100 and optionally with the short haft 102 and swan-neck component 104. The sheath 230 includes: a sheath body 232 (made from a durable fabric that is preferably brightly coloured to aid in locating the sheath 230); two back belt straps 234 (for positioning the sheath 230 at the back of the user); two side-hip belt straps 236 (for positioning the sheath 230 at the side of the user); a digging and cutting head receiving slot 238; a retention strap 240 (for securing the digging and cutting head 100 within the sheath 230); two swan-neck component loops 242 (for carrying the swan-neck component 104 on the exterior of the sheath 230); two haft loops 244 (for carrying a haft, presumably a short haft 102) on the exterior of the sheath 230; a hard edge 246 (suitable, for example, for scraping ice from the windshield of a vehicle without damaging the glass); a plurality of mated pairs of hook and loop fasteners 248 (for releasably securing the back belt strap 234, side-hip belt straps 236 and retention strap 240); and one or more scratch patches (not shown) being the hook component of a hook and loop fastener (for use in scouring, e.g., cleaning tools, removing frost from a vehicle windshield etc.).

FIGS. 18-20 show a rake head 260 (shown assembled with a long haft 220 in FIGS. 19 and 20). The rake head 260 is both foldable in that it can be folded to capture a volume of material (e.g., a collection of leaves) and furled (as shown in FIGS. 19 and 20) for storage.

The rake head 260 includes three hingedly interconnected tine holders 262, each tine holder 262 having: a Reuleaux triangle bore 120, a tine set 264 and a tine furler assembly 266. Each tine set 264 comprises a plurality of tines 268 wherein the tine set 264 is configured such that the tines 268 are resiliently biased to move to, and remain in, a splayed arrangement (as shown in FIG. 18) suitable for raking. The tine furler assembly 266 includes; a car 270 and track 272; a linkage strut 274 attached at one end to the car 270 and attached at the other end to a curved tine bridge 276. The tine bridge 276 has a plurality of bridge slots, each bridge slot having interposed therein a respective tine 268. The end of the tine bridge 276 opposite the end of the tine bridge 276 to which the linkage strut 274 is attached, is pivotally attached to an adjacent tine 268. In use, a tine set 264 may be furled by moving the car 270 towards the tine set 264 so as to bring the tine bridge 276 into the angled position indicated in FIGS. 19 and 20, which draws the tines 268 of the tine set 264 into a furled curved arrangement. Friction between the car 270 and the track, and between the tine bridge 276 and the tines 268, tends to cause the tine furler assembly 266 to remain in the furled arrangement when furled by the user.

The hinged interconnection between the tine holders 262 may be resiliently biased to remain in the open position (i.e., in the position suitable for raking as shown in FIG. 18), such as by a spring integrated in each of the hinged connections or a spring interposed between each pair of adjacent tine holders 262. Alternatively, the rake head 260 may include releasable locking means for manually securing the rake head 260 in each of the open and folded positions.

In use, a rake may be assembled by inserting a haft (presumably a long haft 220) in any of the three Reuleaux triangle bores 120 of the rake head 260. When it is desirable to fold the rake head 260 to capture a volume of material, the swan-neck component 104 may be attached to one of the side Reuleaux triangle bores 120 of the rake head 260, so as to provide a handle and useful leverage when folding the rake head 260, in which case the long haft 220 is most usefully attached to the other side Reuleaux triangle bore 120 of the rake head 260. Catches or control extender rods optionally may be added to enable the user to control folding or furling from higher up the haft.

FIGS. 21-23 and 28 show a claw hammer head 280 (shown assembled with a long haft 220 in FIG. 28). The claw hammer head 280 includes: a Reuleaux triangle cavity 182, a claw 282, a Reuleaux hammer face 284 and a plank lifting lug 286. The shape of the Reuleaux hammer face 284 enables the user to strike closer to an inside corner than can typically be achieved with a conventional round hammer face. The Reuleaux hammer face 284 includes a waffle texture 288, that is, the Reuleaux hammer face 284 is textured with a pattern of spaced projecting squares with a preferred embodiment within 50% of about 2 mm square and about 0.25 mm deep, as such texturing tends to decrease deflection of nail heads struck by a hammer face. The plank lifting lug 286 is used in plank lifting, that is in lifting floor boards or other planks, by interposing a portion of a board between the plank lifting lug 286 and the Reuleaux hammer face 284 and applying lateral force to the long haft 220 so as to lever the board.

FIGS. 24 and 30 show a snow shovel head 290 (shown assembled with a long haft 220 in FIG. 30). The snow shovel head 290 includes a snow shovel blade 292 and three Reuleaux triangle bores 120. The snow shovel blade 292 shown in the drawings is a conventional such blade primarily intended for moving snow by pushing the snow along a flat surface (e.g., a driveway), which use typically involves a "spill" of built up snow from one or both ends of the blade. The three Reuleaux triangle bores 120 are angled relative to each other so as to: enable the user to select a preferred angle for the haft relative to the snow shovel blade 292 (so as to angle the snow shovel blade 292 relative to the pushing force, e.g., for control of "spill"); or to permit the snow shovel head 290 to be assembled with two hafts, so as to enable two users to use the assembled snow shovel. The snow shovel head 290 may also be assembled with the swan-neck component 104 and a haft (presumably a long haft 220), for use in drawing snow towards the user, such as for drawing snow off a deck or step.

FIGS. 25 and 27 show a garden fork head 300 (shown assembled with a long haft 220 in FIG. 27). The garden fork head 300 includes a fork 302 and Reuleaux triangle bore 120. As shown in the drawings, the Reuleaux triangle bore 120 is preferably angled relative to the fork 302 so as to provide a desired user stance and positioning when digging and levering using the assembled fork.

Although the arrangement options provided by the digging and cutting head 100 and the swan-neck component 104, along with the short haft 102 or long haft 220 are understood to provide many of the functionalities understood to be of use to a typical user, if desired, additional heads, not shown in the drawings, could be incorporated in the hand-tool system, including pruning saw heads, scythe heads, edger heads, dibbler heads, dustpan heads, scoop heads, pick heads, adze heads, hatchet heads, tamper heads, coal shovel heads and any other specific tool head conventionally used with a straight or bent haft.

A removable lanyard (not shown), to switch to use as an auxiliary handle attachable at any appropriate point to assist two-handed pulling or lifting, constructed of paracord with a braid and connector, could usefully be incorporated in the hand-tool system.

The following descriptive terms and reference numbers are used in the above description and in the drawings: digging and cutting head 100; short haft 102; swan-neck component 104; spade-like configuration 106; hoe-like configuration 108; mount 110; blade 112; Reuleaux triangle bore 120; stub receiving opening 122; lobe-engagement opening 124; retainer slot 126; set screw hole 128; central panel 130; flat panel 132; curved panel 134; central panel spade tip portion 136; tip bend 138; side bend 140; flat side panel spade tip portion 142; flat side panel cutting edge 144; flat side panel hemmed edge 146; cutter section 148; planar ledge 150; spade tip point 160; spade tip 162; curved panel side edge 170; curved panel cleat edge 172; cleat 174; swan-neck body 180; Reuleaux triangle cavity 182; Reuleaux triangle stub 184; toggle assembly 186; toggle 188; toggle retainer bolt 190; spring washer 192; internal ridges 200; external groove 202; pin receiving hole 204; press fit pins 206; retainer spring 208; set screw hole 210; female threads 212; lobe 214; long haft 220; Reuleaux triangle shaft 222; sheath 230; sheath body 232; back belt straps 234; side-hip belt straps 236; digging and cutting head receiving slot 238; retention strap 240; swan-neck component loops 242; haft loops 244; hard edge 246; hook and loop fasteners 248; rake head 260; tine holders 262; tine set 264; tine fuller assembly 266; tine 268; car 270; track 272; linkage strut 274; tine bridge 276; claw hammer head 280; claw 282; Reuleaux hammer face 284; plank lifting lug 286; snow shovel head 290; snow shovel blade 292; garden fork head 300; and fork 302.

What is claimed is:

1. A hand tool system comprising:
    a haft having a haft longitudinal axis;
    an offset-L component comprising a releasable first attachment means and a releasable second attachment means, the second attachment means oriented at about 90 degrees to the first attachment means; and a digging and cutting head comprising
  a blade, the blade comprising:
    a planar central panel in the shape of an obliquely truncated acute isosceles triangle, the base of the isosceles triangle defining a hoe tip;
    a right panel meeting the central panel at a bend having an angle of about 8 degrees and having a tip edge meeting the hoe tip at an angle of about 135 degrees, the tip edge and the hoe tip together defining a spade tip; and
    a left panel meeting the central panel at a bend having an angle of about 8 degrees and having a top edge defining a foot cleat; and
  a mount for releasably attaching the digging and cutting head to the haft or to the offset-L component, and defining a mount longitudinal axis,
  wherein the mount and blade are affixed one to another such that: the mount longitudinal axis lies within a plane substantially normal to, and substantially bisecting, the central panel isosceles triangle; and the mount longitudinal axis intersects the plane defined by the central panel at an angle of about 15 degrees;
wherein, the haft, offset-L component, and digging and cutting head may be selectively releasably assembled:
  into a spade-like configuration, by attaching the first attachment means to an end of the haft and attaching the mount to the opposite end of the haft, and in which the second attachment means functions as a handle extending substantially perpendicular to the haft longitudinal axis and the haft is angled relative to the spade tip; or
  into a hoe-like configuration, by attaching the first attachment means to an end of the haft and attaching the mount to the second attachment means, and in which the hoe tip is substantially normal to a plane containing the haft longitudinal axis and the mount longitudinal axis.

2. The hand tool system of claim 1, wherein:
the identical angles of the central panel isosceles triangle are about 80 degrees; and
a plane bisecting the 135 degree angle defined by the meeting of the tip edge and the hoe tip, and normal to the plane defined by the central panel, intersects at an angle of about 22.5 degrees, a plane substantially normal to the plane defined by the central panel and containing the mount longitudinal axis.

3. The hand tool system of claim 2, wherein: the left panel is curved and the foot cleat is corrugated.

4. The hand tool system of claim 1, wherein:
the mount and the first attachment means each comprises a longitudinally extending chamber having a cross section substantially in the shape of a Reuleaux triangle; and
the two ends of the haft and the second attachment means, each comprise a stub configured for mating engagement with any one of the longitudinally extending chambers.

5. The hand tool system of claim 4, wherein:
the mount chamber has a stub receiving opening and a securement opening; and
the second attachment means further comprises a toggle manually rotatable between an insertion position in which the toggle does not impede movement of the stub into the stub receiving opening and an engagement position in which the toggle engages the securement opening so as to impede withdrawal of the stub from the mount chamber.

6. The hand tool system of claim 4, wherein:
each stub includes a depressable projecting catch; and
each chamber includes a catch opening configured for receiving the catch when the stub is inserted into the chamber;
whereby, when the catch is in the catch opening, the catch impedes withdrawal of the stub from the chamber, and the catch may be manually depressed so as to permit withdrawal of the stub from the chamber.

7. The hand tool system of claim 4, further comprising a rake head comprising two or more hingedly connected tine holders, each tine holder comprising:
  a tine set comprising a plurality of tines resiliently biased to move to, and remain in, a splayed arrangement; and
  a longitudinally extending chamber having a cross section substantially in the shape of a Reuleaux triangle configured for mating engagement with one of the stubs;
wherein, the haft, offset-L component, and rake head may be selectively releasably assembled with the haft mounted to one of the tine holders and the offset-L component mounted to another of the tine holders, whereby the offset-L component may be manipulated to articulate the hinged connection between the tine holder to fold the rake head when gathering a volume of material in the tines.

8. The hand tool system of claim 7, wherein each tine holder further comprises a tine furler assembly comprising:
  a track fixed relative to the tine set and substantially aligned with the tines;
  a car mounted to, and slidable along, the track;
  a tine bridge spanning the tines of the tine set and having a slot corresponding to each such tine and within which each such tine is interposed, wherein the tine bridge is pivotally attached to a tine in the vicinity of an end of the tine bridge; and
  a linkage strut attached at one end to the car and attached at the other end to the tine bridge at the end of the tine bridge opposite where the tine bridge is pivotally attached to the tine,
wherein the tine set may be brought into a furled arrangement by moving the car towards the tine set so as to bring the tine bridge into an angled orientation relative to the tines.

9. The hand tool system of claim 8, wherein the tine bridge is curved whereby the furled arrangement is a curved furled arrangement.

10. The hand tool system of claim 4, further comprising a claw hammer head comprising:
  a hammer face;
  a longitudinally extending chamber having a cross section substantially in the shape of a Reuleaux triangle configured for mating engagement with one of the stubs; and
  a plank lifting lug.

11. The hand tool system of claim 4, further comprising a snow shovel head comprising:
  a snow shovel blade; and
  a plurality of longitudinally extending chambers angled relatively to each other, and each chamber having a cross section substantially in the shape of a Reuleaux triangle configured for mating engagement with one of the stubs;
wherein the haft, offset-L component, and snow shovel head may be selectively releasably assembled:
  into a snow shovel-like configuration, with the haft stub inserted in one of the snow shovel head longitudinally extending chambers; and into a snow-draw configuration, with the offset-L component stub inserted in one of the snow shovel head longitudinally extending chambers and the haft stub inserted in the offset-L component longitudinally extending chamber.

12. The hand tool system of claim 11, further comprising a second haft wherein the hafts and snow shovel head may be selectively releasably assembled into a double-handled snow shovel-like configuration, with one of the stubs of one of the hafts inserted in one of the snow shovel head longitudinally extending chambers; and one of the stubs of the other of the hafts inserted in another of the snow shovel head longitudinally extending chambers.

13. The hand tool system of claim 4, further comprising a garden fork head comprising:
   a fork; and
   a longitudinally extending chamber having a cross section substantially in the shape of a Reuleaux triangle configured for mating engagement with one of the stubs.

14. The hand tool system of claim 1, further comprising additional hafts wherein the hafts have lengths different from each other.

15. The hand tool system of claim 1, further comprising:
   a second haft wherein the hafts have different lengths; and
   additional heads each interchangeable with the digging and cutting head.

16. The hand tool system of claim 15, wherein the additional heads are selected from the group consisting of a rake head; a claw hammer head, a snow shovel head, a garden fork head, and combinations of two or more of the foregoing.

\* \* \* \* \*